Aug. 3, 1937.   A. F. POTT   2,088,974
DIVISION ARRANGEMENT FOR CALCULATING MACHINES AND THE LIKE
Filed July 8, 1932   10 Sheets-Sheet 1
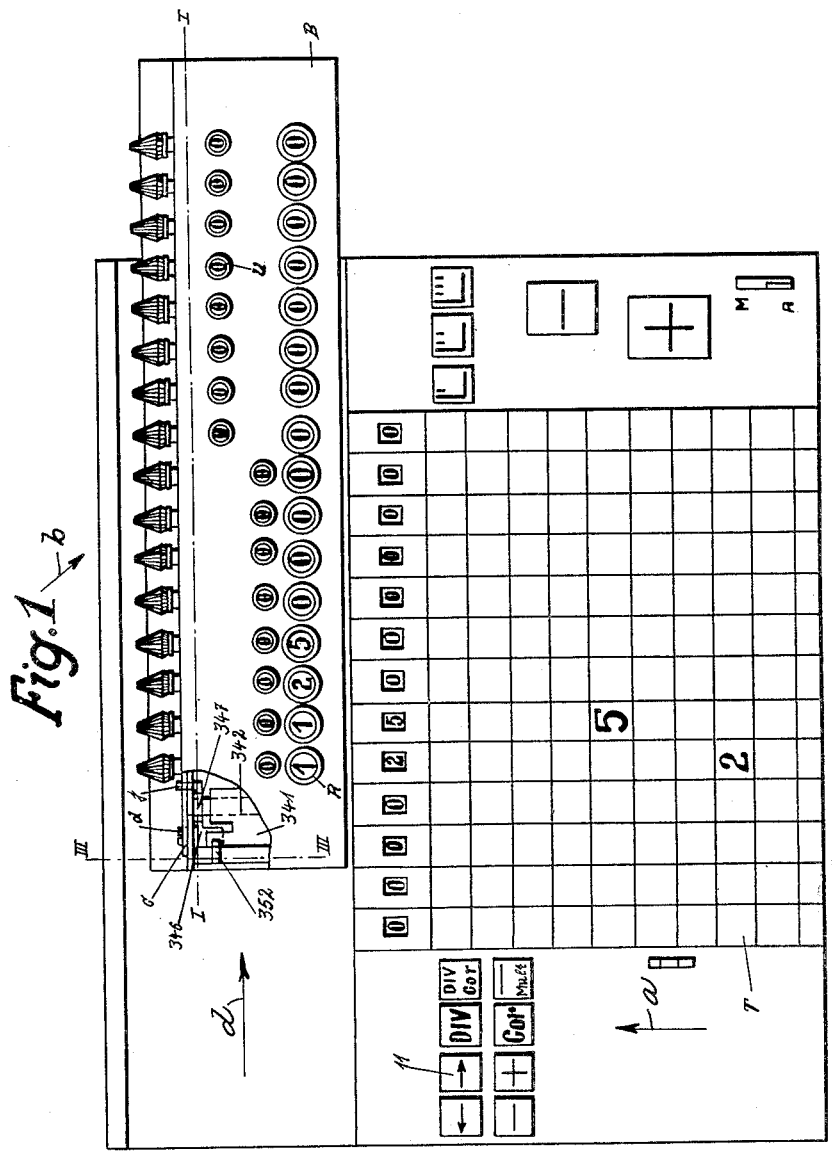

Aug. 3, 1937.  A. F. POTT  2,088,974
DIVISION ARRANGEMENT FOR CALCULATING MACHINES AND THE LIKE
Filed July 8, 1932  10 Sheets-Sheet 2
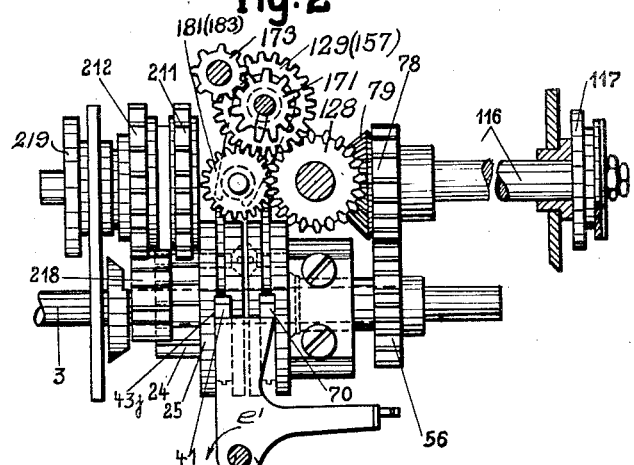
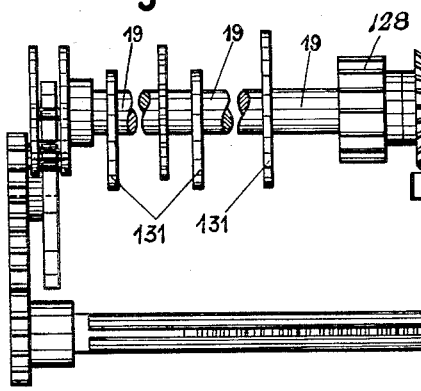
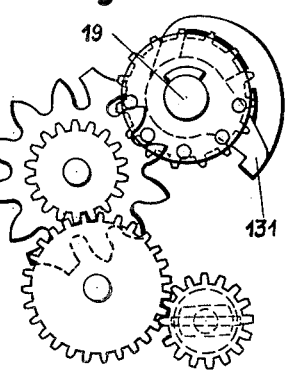
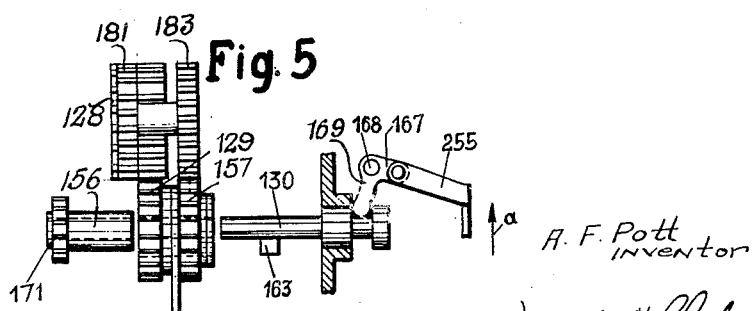
A. F. Pott
INVENTOR
By: Marks & Clerk
Attys.

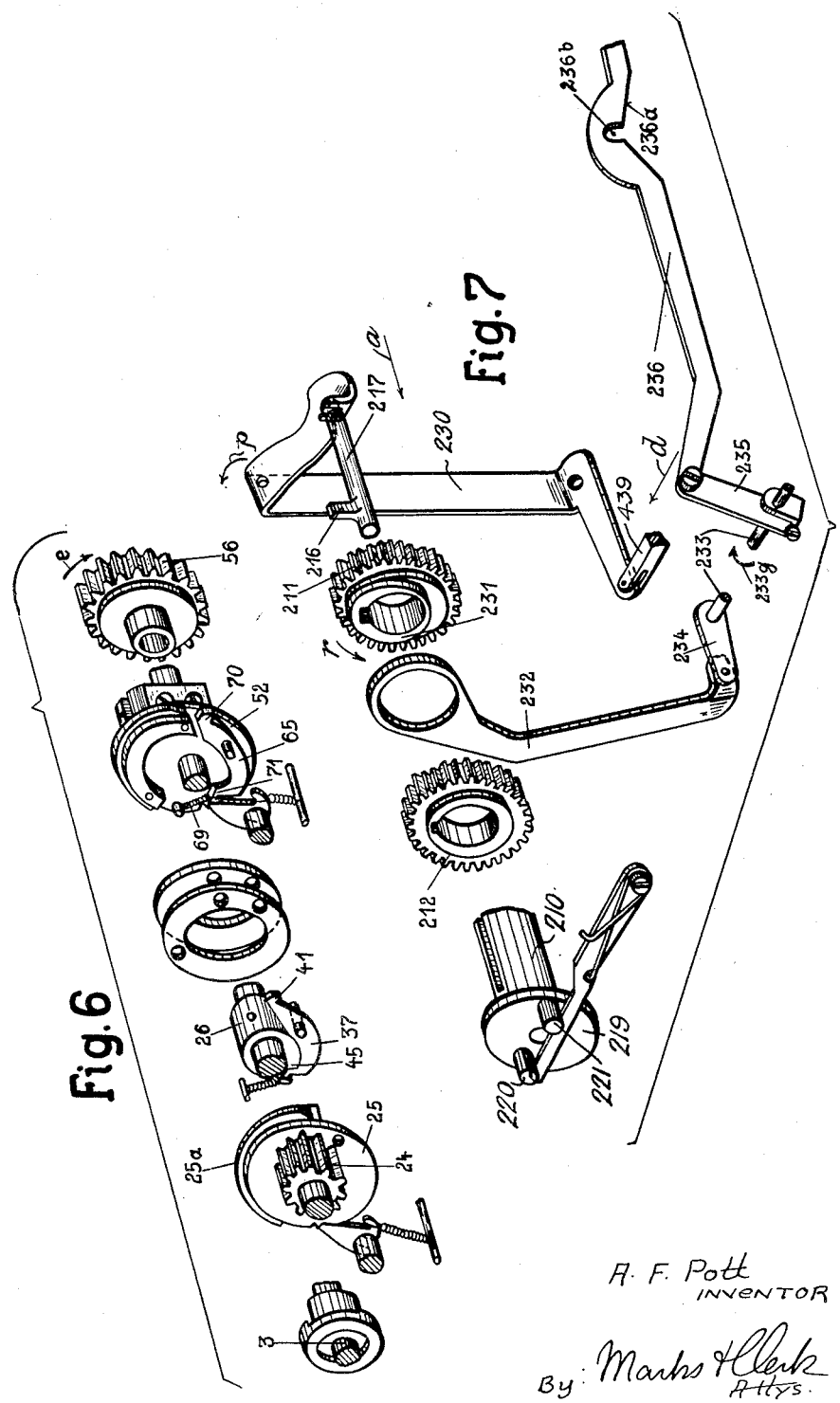

Aug. 3, 1937.                A. F. POTT                2,088,974
DIVISION ARRANGEMENT FOR CALCULATING MACHINES AND THE LIKE
              Filed July 8, 1932        10 Sheets-Sheet 5
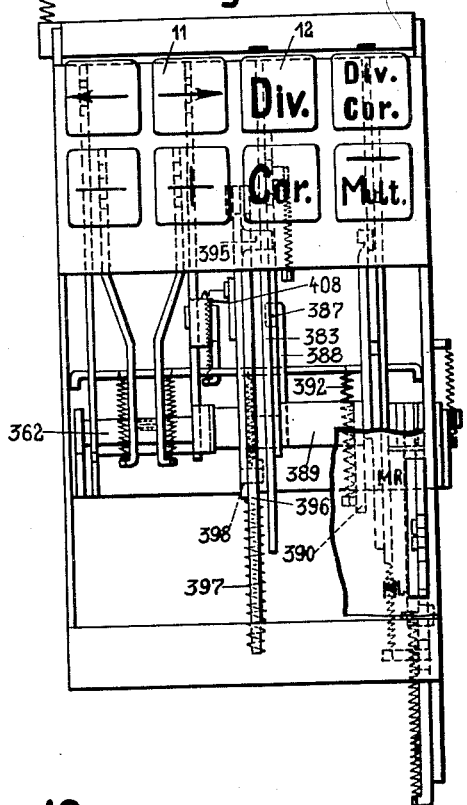
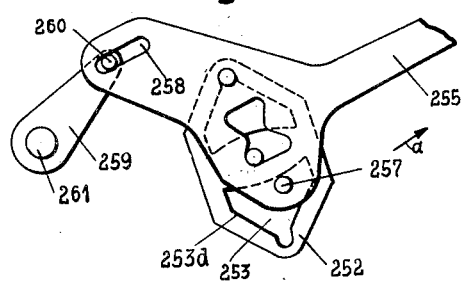
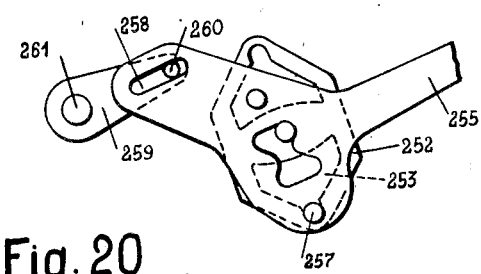
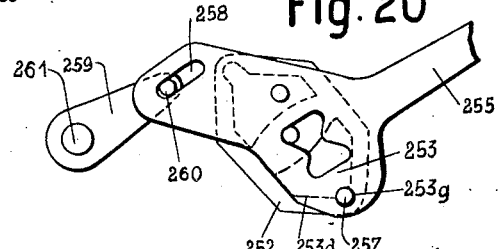

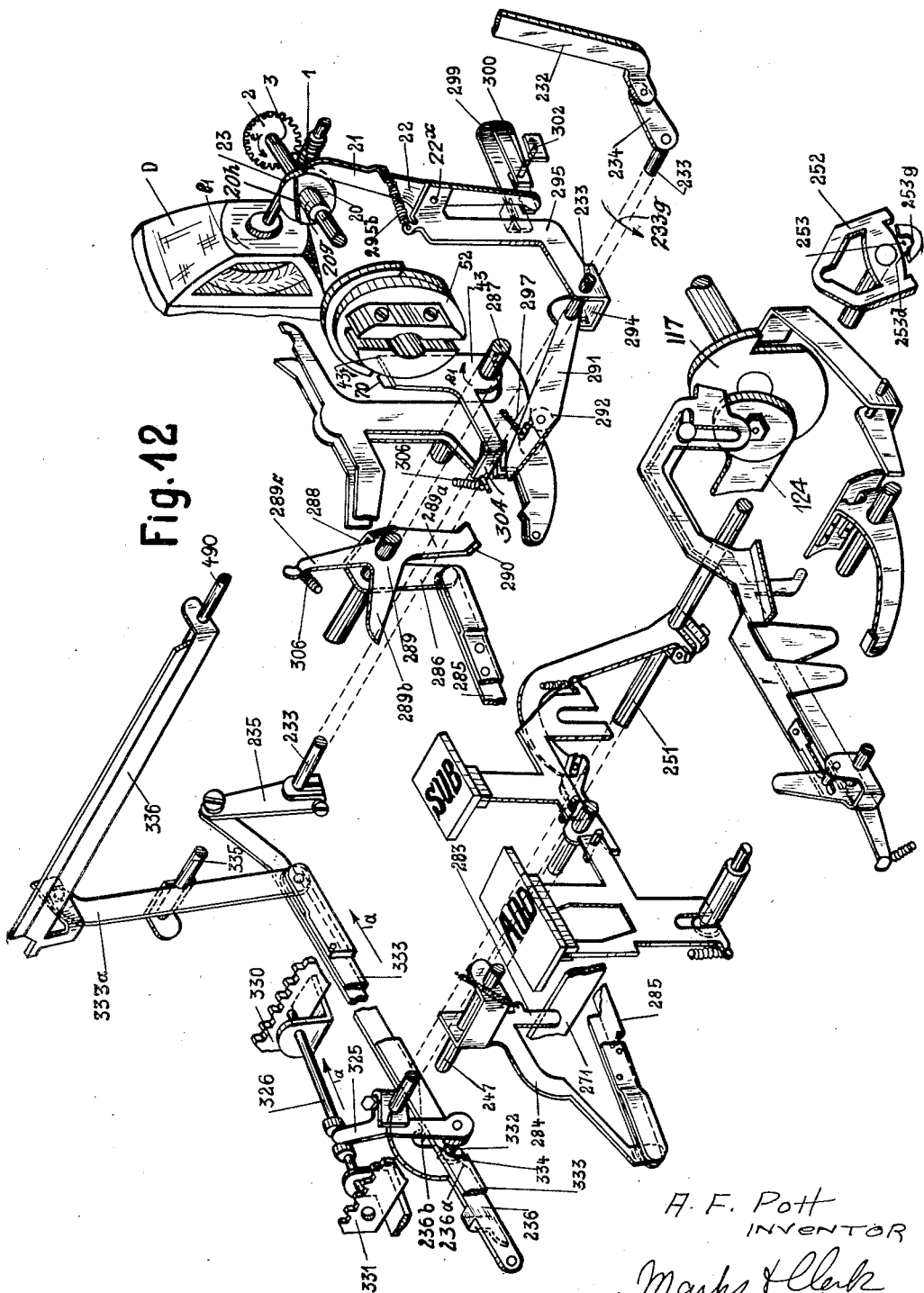

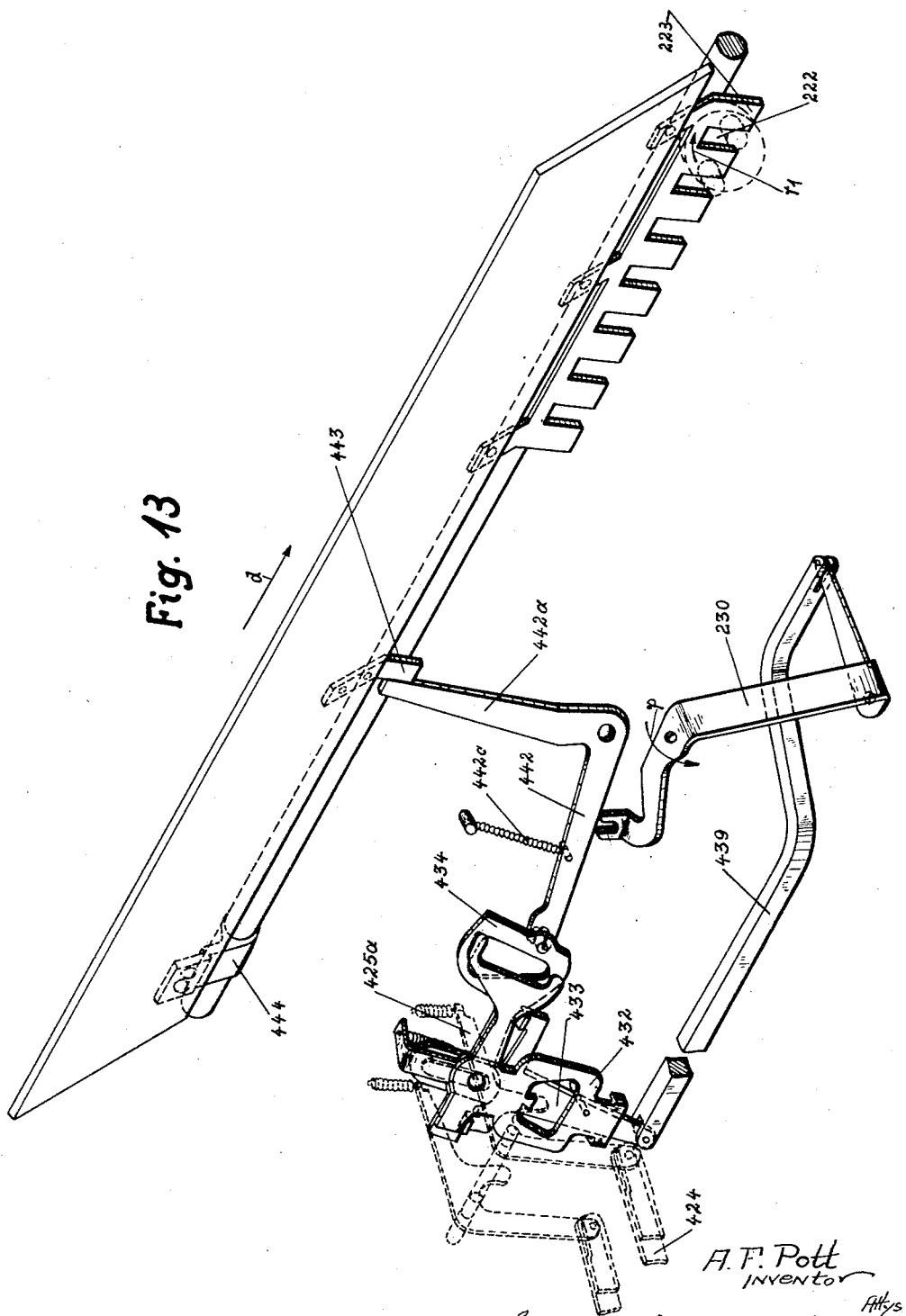

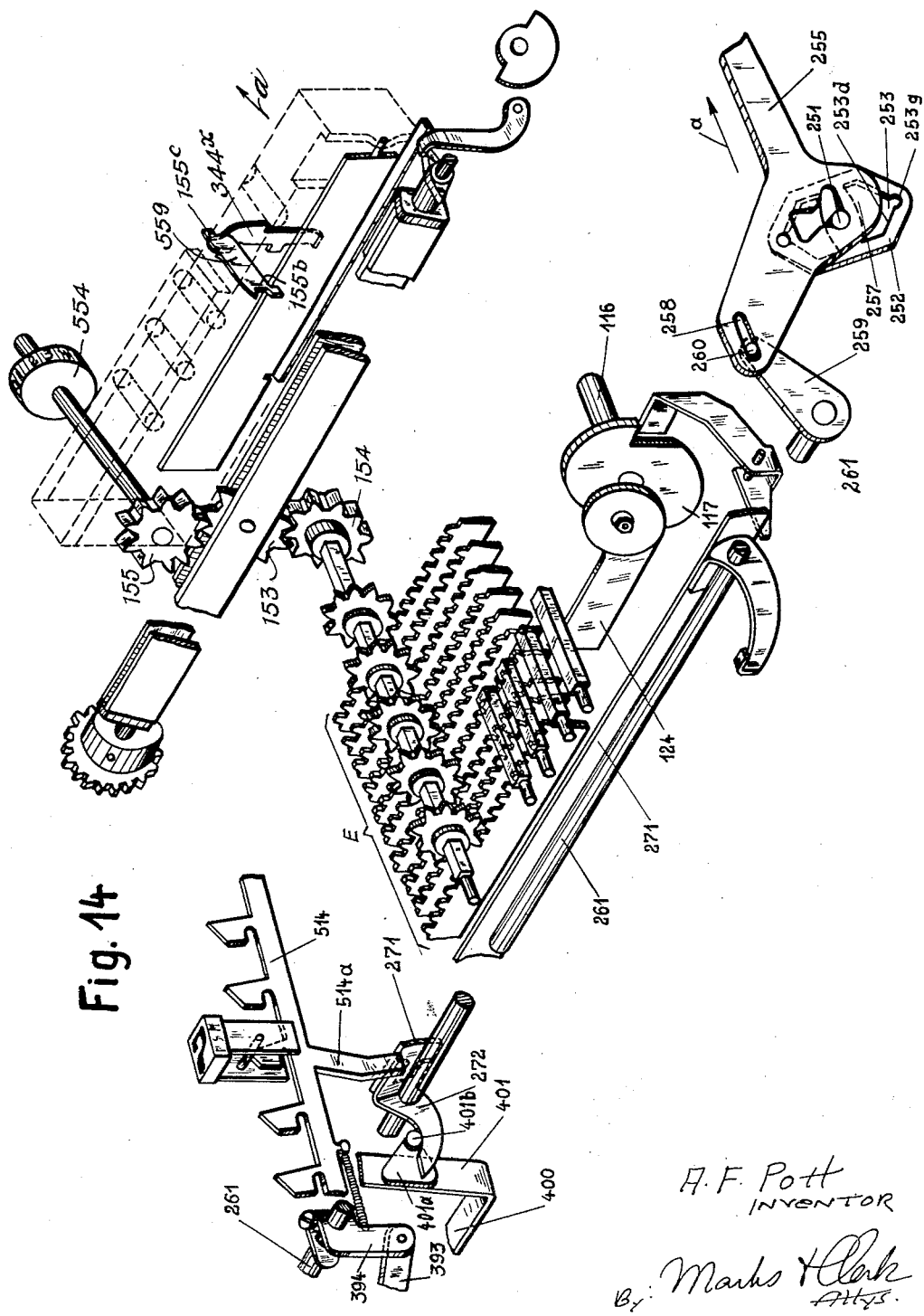

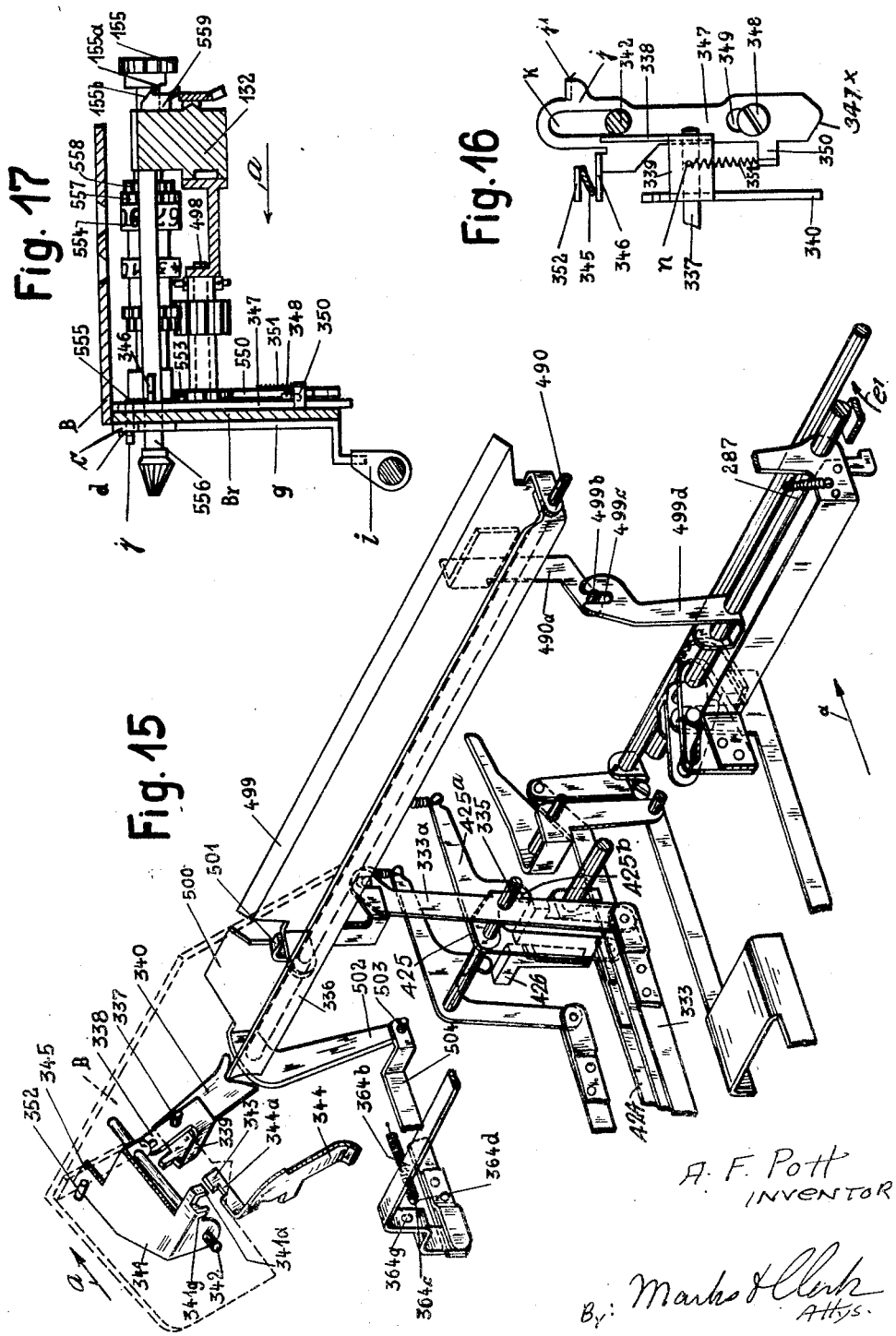

Aug. 3, 1937.  A. F. POTT  2,088,974
DIVISION ARRANGEMENT FOR CALCULATING MACHINES AND THE LIKE
Filed July 8, 1932  10 Sheets-Sheet 10
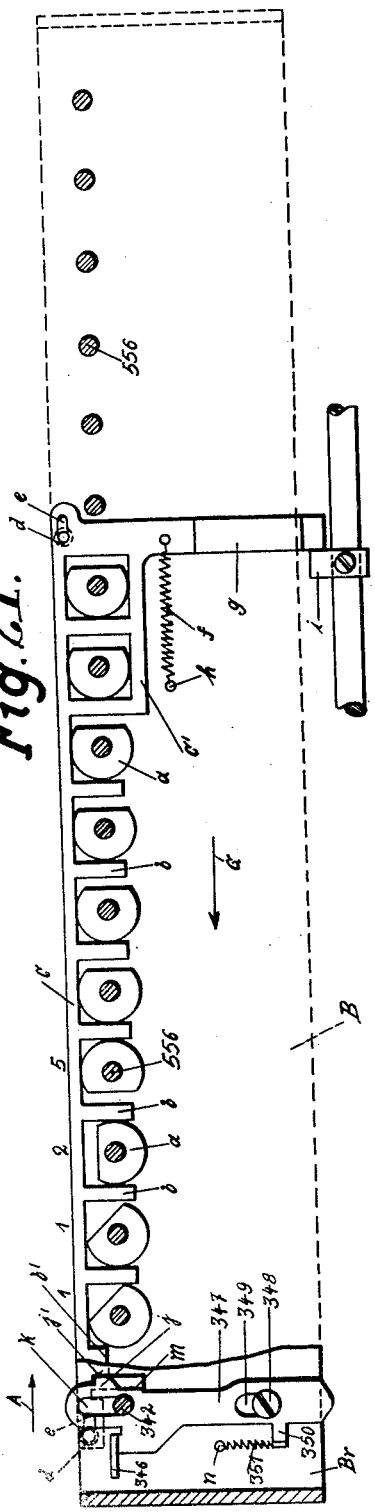
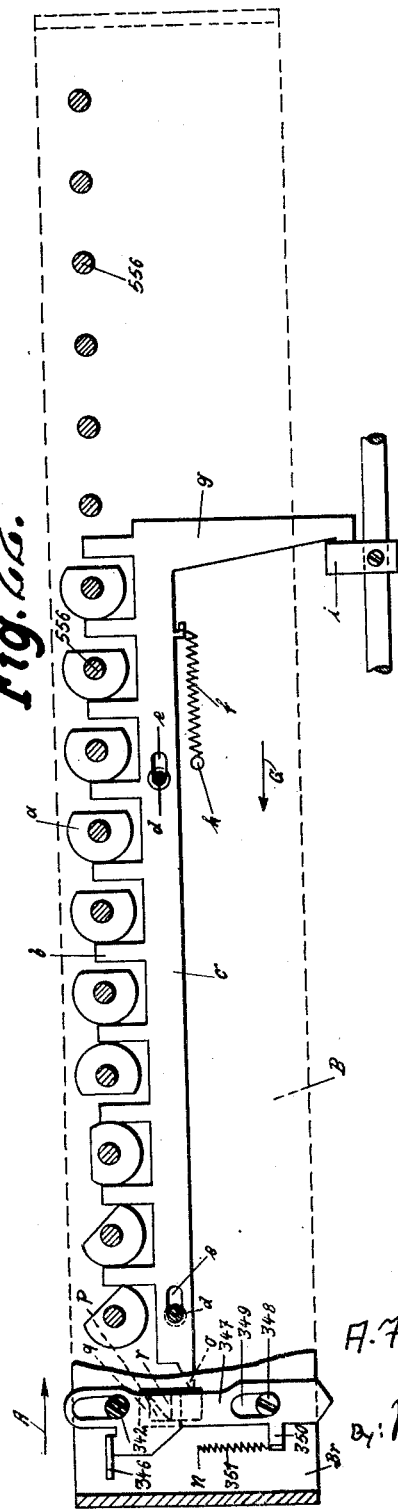

Patented Aug. 3, 1937

2,088,974

UNITED STATES PATENT OFFICE 2,088,974

DIVISION ARRANGEMENT FOR CALCULATING MACHINES AND THE LIKE

August Friedrich Pott, Zella-Mehlis, Thuringia, Germany, assignor to Mercedes Büromaschinen - Werke Aktiengesellschaft, Benshausen, Thuringia, Potstamt Zella-Mehlis, Germany Application July 8, 1932, Serial No. 621,433
In Germany July 16, 1931

11 Claims. (Cl. 235—73)

The invention relates to a division arrangement for calculating machines and the like.

In the process of division it frequently happens that the divisor has already gone into the dividend before the register carriage has reached its extreme left position. In these cases, up to the present, in order to return the register carriage into its extreme left position, the divisor must be alternately added or subtracted in each successive carriage position until the capacity of the register is overreached to cause the carriage to be released for one step and enable it to be returned step by step into its extreme left position.

This method of working is, however, inconvenient and entails a loss of time, while the value entering mechanism of the machine is unnecessarily stressed.

These disadvantages are avoided according to the invention, in which controllable members in dependence upon the zeroizing of the register, are provided for automatically cutting out the operation of the value entering mechanism.

In the drawings, two forms of the invention are illustrated by way of example.

Fig. 1 shows a plan of a Mercedes-Euclid calculating machine, in which the register carriage is illustrated drawn out into its extreme right hand position, and the example of division employed is set for the hereinafter following description of the method of operation of the improvement. On the left upper corner of the register carriage for the purpose of disclosing the parts relating to the improvement, the cover plate of the register carriage is partly broken away.

Fig. 2 shows a view of the main drive shaft with the carriage shift clutch and of the clutch of the value entering mechanism, viewed in the direction of the arrow $d$ of the Figure 1.

Fig. 3 shows a plan of the coupling mechanism for transferring the values set up in the keyboard from the value entering mechanism to the numeral wheels of the result-register together with the tens carrying shaft for the latter and the driving parts for the tens carrying shaft.

Fig. 4 shows a partial side elevation according to Fig. 3.

Fig. 5 shows a draw key coupling for the change gear of the tens-carrying shaft of the revolution counter in which the different parts for the sake of clearness are separated out of one another.

Fig. 6 shows a perspective view of the main drive shaft, with the two driving-clutches viewed in the direction of the arrow "$b$" in Figure 1, with the parts separated out from one another.

Fig. 7 shows a perspective view with the parts separated out of one another of the draw-key coupling for the change gear of the carriage shifting mechanism together with the control parts viewed in the direction of the arrow "$b$" in Figure 1.

Fig 11 shows a plan of the operating keys arranged in a frame.

Fig. 12 shows a perspective view of the machine taken from the front right-hand side of the mechanisms controlled by the addition and subtraction keys together with the motor contact and a part of the driving motor, in which the parts for the sake of clearness are represented separated out of one another.

Fig. 13 shows a perspective view taken from the front right-hand side of the machine of the controlling elements of the carriage-shift device.

Fig. 14 shows a perspective view of the keylocking mechanism operating during a calculating process of the value entering mechanism of the coupling mechanism for transferring values from the value entering mechanism to the result-register, as well as the arrangement of the locking rail for the tens preparatory slides.

Fig. 15 shows in perspective view some details of the division mechanism.

Fig. 16 shows a detail in elevation.

Fig. 17 shows a section through the totalizer on the line III—III on Fig. 1.

Figs. 18 to 20 show different positions of the control lever for the draw key coupling of the change gear for the revolution counter in that position which is brought about by the depression of the division key 12.

Figs. 21 and 22 show two modifications of the invenion proper, viz.:

Fig. 21 shows a front sectional elevation on the section line I—I on Figure 1, in which only a small part of the left hand end of the rear wall of the totalizer carriage is represented, whilst the remaining part of the same, extending to the right, is omitted.

Fig. 22 shows a second somewhat modified form of the improvement.

The invention has been applied to a Mercedes-Euclid calculating machine such as has been described in my pending patent application, Serial Number 564,643 filed September 23, 1931.

The method of operation of the known Mercedes-Euclid calculating machine with which in the present instance the device according to the invention is incorporated as one example of the application of the invention is briefly described hereunder.

In the division operation first the key 11 (Fig. 10) for shifting the carriage to the right is depressed and the carriage B brought into its extreme right position wherein the dividend is set with its highest place preferably in the highest place of the result register R. The divisor is then set in the keyboard T and, of course, so that its highest place is situated beneath the highest place of the dividend. In this manner, as is known, the divisor with the greatest number of places can be set with regard to the dividend.

It is naturally not necessary to set the dividend unconditionally wholly to the left or to set the divisor with its highest place beneath the highest place of the dividend.

With regard to the following, it will nevertheless be assumed that the dividend and the divisor are set as indicated above. Furthermore, it will be noted that in the Mercedes-Euclid calculating machine the subtraction or division operations are effected through addition of the complement of the subtrahend or divisor.

As is well known, when the value entering mechanism and accordingly the result register R subtract, the quotient register or revolution counter U adds and when the value entering mechanism adds, the revolution counter subtracts.

As in any division process, the divisor must first be subtracted from the dividend, on depression of the division key 12, the value entering mechanism must be shifted to subtraction and the revolution counter to addition. This is performed in the following manner.

Figure 10:
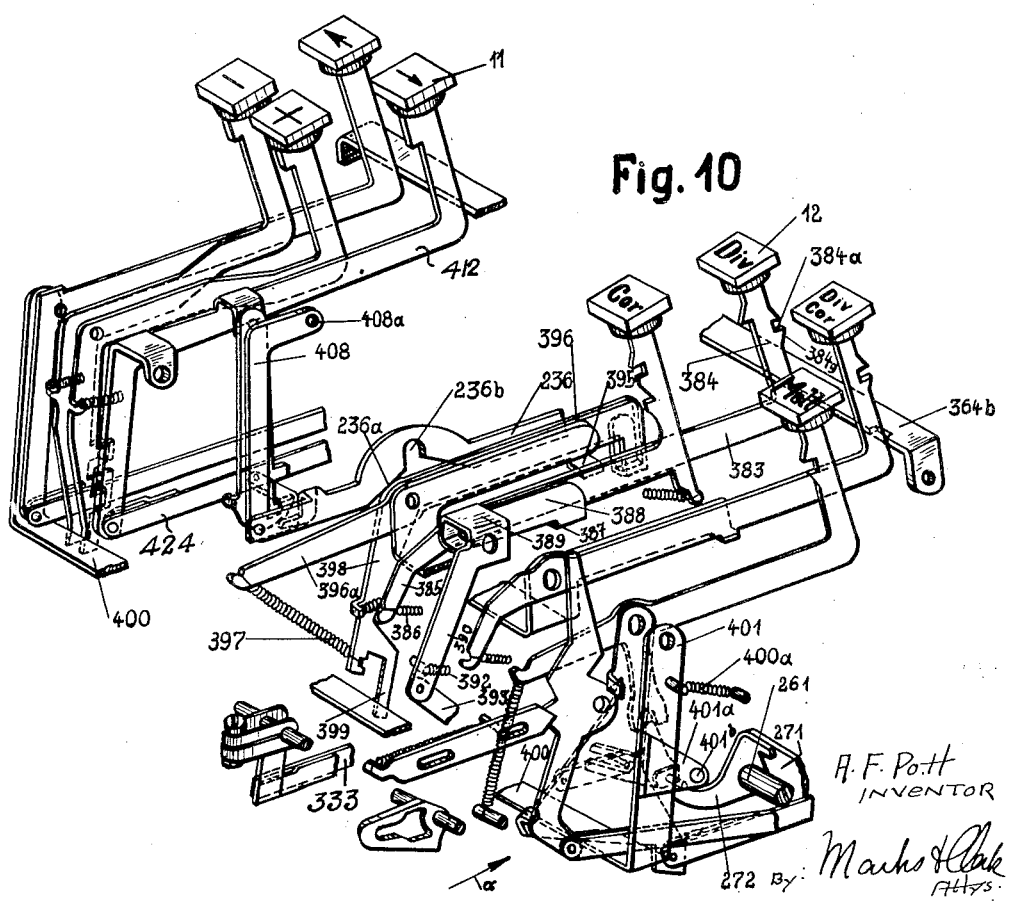
Fig. 10 shows a perspective view taken from the front right-hand side of the machine of the arrangement of the operating keys with the parts represented as separated out of one another.

On pressing the key 12, the key lever 383, Figures 10 and 11, is swung against the spring 386 engaging with its arm 385, whereby the lever 383 acts on the lug 387 of the bail 388, 389, 390 and swings the same around the shaft 362 (Fig. 11), against the spring 392 attached to it in the clockwise direction. The connecting link 393, Figures 10 and 14, jointed to the arm 390 of the bail 388, 389, 390, consequently swings the lever 394 rigidly mounted on the shaft 261, and the shaft 261 itself in the clockwise direction as seen in Fig. 14. In this swinging movement, the lever 259 rigidly mounted on the shaft 261 partakes and is swung out of the position represented in Figure 18 and as the lever 259 is connected with the control rod 255, by means of the pin and slot connection 260, 258 so the control rod 255 is swung into the position illustrated in Figure 20. This position according to Figure 20 is attained in the following manner:

On depression of the division key 12, Figures 10 and 11, the key lever 383 acts on the lugs 395 of the lever 396 and swings this in the clockwise direction around the shaft 362, Figure 11. By means of the spring 397, engaging with its arm 396a the lever 398 is likewise acted on in the clockwise direction around the shaft 362, whereby the lever 408 jointed to it at the point 408a, depresses the rod 236 along with it. If now the pin 326 is disposed in the addition position represented in Figure 12, in which it holds locked the rack 330 of the value entering mechanism, so the pin 332 fixed to the lever 325 is disposed in the path of movement of the inclined surface 236a, of the recess of the rod 236. In the depression of the division key 12, the inclined face 236a acts on the pin 332, whereby the lever 325 is swung in the anti-clockwise direction, and as a consequence the coupling pin 326, Figure 12, is displaced in the opposite direction to that of the arrow "a", whereby the rack 330 is now released and the rack 331 blocked, so that the value entering mechanism is set for subtractive operation whereby the coupling position arrived at is secured by the entrance of the pin 332 of the lever 325 into the slot 236b of the rod 236.

Figure 8:
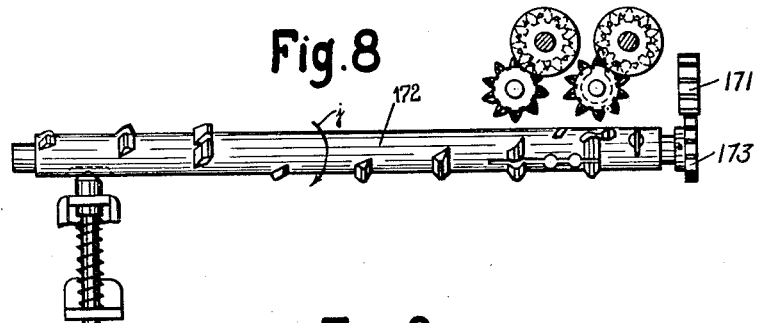
Fig. 8 shows a front view of the tens carrying shaft for the revolution counter viewed in the direction of the arrow "$a$" in Figure 1.

With the swinging of the lever 325, Figure 12, and consequently that of the shaft 251 in the anti-clockwise direction, the control lever 252 fastened on to this is also swung from the position shown in Figure 18 into the position illustrated in Figure 20. On the other hand, however, as above mentioned, the control rod 255 is pressed downwards by the lever 259, so that to begin with only the inclined edge 253d of the lever 252 and the pin 257 of the control rod 255 are moved towards each other. As soon as the edge 253d and the pin 257 come into contact with one another, the pin 332, Figure 12 of the lever 325 enters into the slot 236b of the rod 236, whereby a further rotation of the shaft 251 and therefore of the lever 252 in the anti-clockwise direction is prevented, whilst the control rod 255 is pressed further downwards. Consequently the pin 257 of this rod slides along the edge 253d of the control lever 252, whereby the rod 255 is displaced in the direction of the arrow "a" and through the angle lever 167, 169, Figure 5, jointed to it, the draw key 130, 163 is displaced to the right, so that the toothed wheel 157 is coupled with the draw key sleeve 156 and consequently the revolution counter shaft 172, Figure 8, is driven in the direction of the arrow "j" that is additively, whereby the revolution counter U adds. The draw key 130, 163 is then secured in its position through the entrance of the pin 257 of the rod 255 into the slot 253g of the lever 252 as this is shown in Figure 20.

Through the swinging of the lever 325, Figure 12 in the anti-clockwise direction, the rod 333, which with its recess 334 embraces the pin 332 of the lever 325, is displaced in the direction of the arrow "a". With this the lever 333a, jointed to the rod 333, Figures 12 and 15 is swung in the anti-clockwise direction. In consequence of this also, the shift flap 336 is swung by the lever 333a in the clockwise direction around the shaft 490. As the shift flap 336 is embraced by the lever 340, Figure 15, the latter is swung in the anti-clockwise direction around the shaft 337, whereby the capacity shift flap 341, which is embraced by the other end 338 of the lever 340, is displaced on its shaft 342 in the reverse direction to that of the arrow "a", so that the nose 341a mounted on it, lies in the path of the nose 343 of the tens carrying slide 344 lying adjacent to the highest numeral wheel of the result register R.

On the arrival of the carriage B into the right hand end position, the change gear 211, 212, Figure 2, of the carriage shifting device was set automatically through the striking of the part 444, Figure 13, against the arm 442a of the angle lever 442, so that the draw key 217, 216, Figure 7 through the intermediary of the parts 434, 433, 439 and 230 is coupled with the shift wheel 212, so that on closure of the carriage shift clutch 25, Figure 6, always a step to the left of the carriage takes place.

Consequently substantially all settings for the division operation have been met, and it only remains now to secure these settings through locking of the division key 12 in its depressed position, and to close the motor contact 300, 302 and the clutch 52 for the value entering mechanism. This happens in the following manner:

In the depression of the division key 12, Figure 10, the face 384g of the division key lever 384, 383, acts on the bail 364b, Figure 15 and swings the same around the point 364g (in Fig. 15, only the left part of the bail 364b is indicated), in the clockwise direction against the action of the spring 364d. By means of the connecting rod 504, the flap 502, 500, is swung in the clockwise direction around the shaft 490, which is nevertheless without importance. If now the division key 12 is wholly depressed, the bail 364b is able under the action of its spring 364d, to enter into the recess 384a, Figure 10, of the division key lever 384, 383 and hold this in the depressed position.

In the depression of the division key 12, Figure 10, as already mentioned, the division key lever 383 acts further on the lug 395 of the lever 396. In the swinging movement of the lever 396 in the clockwise direction around the shaft 362, the lever 398, through the intermediary of the strong spring 397, which remains uninfluenced, is likewise acted on in the clockwise direction. With this, the part 399, of the lever 398, acts on the bail 400, 401 and swings it against the action of the spring 400a, connected to the arm 401, of the bail 400, 401 round a shaft 362 in the clockwise direction. In this swinging movement also, consequently, participates the part 401a, rigidly mounted on the arm 401, of the bail 400, 401, on which part the roller 401b is arranged. This acts now in the swinging of the bail 400, 401 on the lever 272, Figure 10 which is arranged loosely on the shaft 261, whereby the latter and the locking bar 271, are acted upon in the anti-clockwise direction. By contact of the bar 271, Figure 14, against the projection 514a, of the key locking bars 514 a depression of the calculating key during a calculating operation is prevented.

In the swinging of the locking bar 271, Figures 12 and 14, the same acts further on the projection 283, Figure 12, of the lever 284, and swings the lever in the clockwise direction around the shaft 247, whereby the connecting rod 285 is acted upon in the opposite direction of the arrow "a". The connecting rod 285 swings now the parts 286, 288, 289a, 289b and 289c in the direction of the arrow "e1". The spring 306 engaging with the arm 289c of the lever 289, Figure 12, acts on the coupling lever 43, which is rigidly mounted on the shaft 287, likewise in the direction of the arrow "e1", whereby the nose 70 of the clutch 52 for the value entering mechanism is released. Hereby the coupling pawl 65, Figure 6, under the action of its spring 69, with its nose 71, is brought into engagement with the tooth 45 of the coupling cam 26 fastened on the driving shaft 3, whereby the cam 26, the pawl 65, and consequently also the clutch housing 52, are carried along in the direction of the arrow "e".

The arm 289a, Figure 12, of the lever 289, acts further, in the swinging of the lever 289 in the clockwise direction, with its face 290 on the roller 292 of the lever 291, and swings this as well as the lever 295, connected with it by means of the bridge 294, against the action of the spring 297 in the anti-clockwise direction around the shaft 233. With this, the contact lever 22 is displaced in the opposite direction to that of the arrow "a" and the arm 21 of the lever 22, which normally through the action of the spring 295b, is in contact with the conical periphery 23 of the cam 20, slips away from this. The contact lever 22 can now swing under the action of the spring 295b in the anti-clockwise direction, whereby under the action of the spring 299, the motor contact 300, 302, is closed. The motor D now commences to run in the direction of the arrow "e1" and rotates the shaft 3 from the worm 1, disposed on the motor shaft acting through the worm wheel 2 in the direction of the arrow "e". As now the clutch 52 for the value entering mechanism Figure 6 is closed, the value entering mechanism 10 which is set for subtraction is driven through the parts 56, 78, 116, 117 and 124 (Figures 2 and 14).

Through the swinging of the coupling control shaft 287, in the direction of the arrow "e1", the lever 499d, Figure 15, fastened on this, is also swung in the direction of the arrow "e1" which on one side through the pin and slot connection 499c, 499b swings the flap 499, rigidly connected with the lever 490a, around the shaft 490 in the anti-clockwise direction whereby the slide 347, mounted on the back wall of the carriage, Figure 16, approximately comes into contact with the flap, whereby it may be remarked that the slide 347 during its downward movement has so much stroke that it is able to swing the flap 499 in every case beyond its initial position in the clockwise direction.

It may be here recalled to memory that subtraction in the Mercedes-Euclid calculating machine is performed by addition of the complementary value of the subtrahend, whereby for the completion of the correct complementary value a "1" is automatically introduced into the units position which "1" by means of the tens transmission is forwarded so far to the left until it is registered on a numeral wheel which does not stand at "9". This method of subtraction is fully explained in U. S. Patent 1,011,617 and need not further be described.

It may be further recalled to memory that if a numeral wheel rotates from "9" to "0", the nose 155a (Fig. 17) of the corresponding pinion 155 acts on the associated preparatory slide 559 which thereby is shifted in the direction of the arrow *a* (Fig. 14). As a result, its nose 155c is brought into the moving path of the appertaining tens shift slide 344x. This arrangement is provided for each decimal place and, of course, also for the highest decimal place, the tens shift slide of which, in contradistinction to the other tens shift slides, is designated by the reference numeral 344 (Fig. 15). Beneath each of the tens shift slides 344x and 344, a cam 131 (Figs. 3 and 4) is fixed to the tens shift shaft 19. As the latter rotates in each operation of the setting up or driving mechanism, all of the tens shift slides 344x and 344 are lifted at each revolution of the tens shift shaft 19. If hereby a preparatory slide 559 is in the moving path of a tens shift slide 344x or 344, such slide, during its lifting movement will tilt to the left. As a result it engages with the pinion 558 (Fig. 17) of the numeral wheel shaft of the next higher decimal place, whereby this shaft is rotated by one unit.

Therefrom it follows that as long as no tens transfer movement takes place in the highest decimal place, the tens shift slide 344 (Fig. 15) will be lifted right vertically, whereas if a tens transfer takes place it will tilt to the left while being lifted.

It may be assumed, that the numeral wheel of the highest place of the result register R has caused no tens transfer to take place in the first subtraction of the division, and the nose 343, Figure 15, of the tens slide 344, lies opposite to the nose 341a of the capacity shift flap 341, so in the raising of the tens shift slide 344 by means of its cooperating eccentric 131, Figures 3 and 4, of the tens shift shaft 19, the capacity shift flap 341 is swung around the shaft 342, Figure 15, in the anticlockwise direction. With this, the lug 345 of the same, presses the slide 347 downwards, Figure 16, against the action of its spring 351, and thereby swings the flap 499 in the clockwise direction around the shaft 490, and, of course, outwards over its initial or middle point. Hereby, through the arm 490a, rigidly connected with the flap 499 and the pin and slot connection 499b, 499c, the lever 499d and the coupling control shaft 287 therewith are swung in the opposite direction to that of the arrow "*el*". Through the swinging out of the shaft 287, in the opposite direction to the arrow "*el*", likewise the coupling lever 43, Fig. 12, rigidly mounted on the shaft 287, is swung under the tension of the spring 306, in the same direction and of course so far that it lies before the nose 70 of the pawl 65 of the clutch 52 for the value entering mechanism and thereby releases the nose 41 (Figs. 2 and 6) of the pawl 37 of the carriage shift clutch 25. In this swinging movement of the coupling lever 43, in the reverse direction to that of the arrow "*el*" against the action of the spring 306 (Fig. 12), the lever 289 is held in its swung-out position in the direction of the arrow "*el*" since through the division key 12, held locked in the depressed position, and by means of the parts 396, Figure 10, 397, 399, 400, 401a, 401b, Figure 14, 272, 271, Figure 12, and 284, the lever 286 rotatably mounted on the rod 287, is held stationary. Although the pawl 37 consequently is released, the closure of the carriage shift clutch 25 is not possible sooner, until the clutch 52 for the setting up or driving mechanism has completed its rotation that is to say, a carrying along of the released pawl 37 of the clutch 25 is only possible, when the tooth 45 of the coupling cam 26, has taken up its position with reference to the pawl 37, as shown in Figure 6.

As soon, however, as this is the case, the clutch 25 is closed, whereby now through the gears 24, Figure 2, 218 and 212, the carriage B is led one step to the left.

As soon as the tens shift slide 344, Figure 15 is released by its co-operating eccentric, the tensioned spring 306, Figure 12, comes into operation, which now endeavours to swing the coupling lever 43 and with it the shaft 287 again in the direction of the arrow "*el*", which nevertheless is not immediately possible, as the coupling lever 43 with its edge 43y rests laterally against the comb 25a (Fig. 6) of the carriage shift clutch 25. If the carriage shift clutch 25 has executed a half of a revolution, the comb 25a releases the coupling lever, whereby now the above mentioned swinging movement of the same can take place under the action of the spring 306, in the direction of the arrow "*el*". As a consequence the coupling lever 43 enters again into the path of the nose 41 of the pawl 37 of the carriage clutch 25 before this could complete a revolution, and as with this, the coupling lever 43 under the action of its spring 306 swings into its original position, so it releases simultaneously the nose 70 of the pawl 65, whereby also the clutch 52 for the value entering mechanism is prepared for closing, in which however the closing itself cannot take place prior to the carriage shift-clutch 25 having completed its revolution or its opening has taken place.

As the carriage shift clutch 25, according to what has been above mentioned also can only execute one revolution the carriage could only make one step to the left. During this carriage step the eccentric 231 disposed on the toothed wheel 211, Figure 7, which is driven by the toothed wheel 24, Figure 2, is moved out of its lower position into the upper position shown in Figure 7. Consequently, the arm 232 has moved upwards and has swung the shaft 233, together with the lever 235 by means of the lever 234 jointed to it, in the arrow direction 233g indicated in Figure 7. The rod 236, Figure 10, is moved in the opposite direction to the arrow "*a*" and as the pin 332, Figure 12, of the lever 325 is in engagement with the slot 236b, Figure 10, of the rod 236, the lever 325, Figure 12, is swung in the clockwise direction and consequently the coupling pin 326 is displaced in the direction of the arrow "*a*". Consequently the rack 331 is now released and the rack 330 blocked, whereby the value entering mechanism is set for additive operation.

In the swinging of the lever 325 in the clockwise direction, the rod 333, which with its slot 334 engages over the pin 332 of the lever 325, is displaced in the opposite direction of the arrow "*a*", whereby the lever 333a, Figures 12 and 15, jointed to it, is swung in the clockwise direction around the shaft 335. The flap 336 is then swung in the anti-clockwise direction, around the shaft 490. The lever 340 embracing the flap 336 is consequently swung in the clockwise direction around the shaft 337. By means of the lever 340 the capacity shift flap 341 is displaced in the direction of the arrow "*a*", so that now the nose 341a of this flap is released from engagement with the nose 343 of the tens shift slide 344, whilst the edge 341g of the capacity shift flap 341 assumes a preparatory working position in relation to the nose 343 of the tens shift slide 344. The working position is on that account a preparatory one, since, as represented in Figure 15, the edge 341g of the capacity shift flap 341 is set back a determined amount in relation to the nose 341a of the same. Therefore, the edge 341g may only then be engaged by the nose 343 of the tens shift slide 344 if the latter through a tens transfer operation is swung to the left.

With the swinging of the lever 325, Figure 12, in the clockwise direction, the shaft 251 is also swung along with it, whereby the change gear 129, 157, Figure 5, of the revolution counter is shifted as follows. In the swinging movement of the shaft 251 in the clockwise direction, the control lever 252 also participates, and takes up in consequence the position according to Figure 19. As with this, the pin 257 of the control lever 255 is disposed in the slot 253g of the control lever 252, the rod 255 is displaced in the opposite direction to that of the arrow "*a*", whereby the angle lever 167, 169, Figure 5, jointed to the rod 255, is rotated around the screw 168 and consequently the draw key 130, 163, is displaced to the left into the position indicated in Figure 5, so that now the toothed wheel 129 is coupled with the draw key sleeve 156, whereby the revolution counter shaft 172, Figure 8 is driven in the opposite direction to the arrow "*j*". As a result, the subtraction faces 184S, 184aS etc., will now come into operation. All these shifting movements, viz. the shifting of the value entering mechanism for subtractive or additive operation, the displacement of the capacity shift flap 341 the shifting of the revolution counter for addition or subtraction take place during the carriage step and by means of the eccentric 231, Figure 7 of the toothed wheel 211.

Likewise already at the beginning of the carriage step, the above mentioned preparation for the closing of the coupling of the value entering mechanism takes place, which now, after all the shifts have taken place, and after the carriage shift clutch 25, through the contact of the nose 41 of the pawl 37 on the coupling lever 43 is opened, is completed.

Accordingly the value entering mechanism is again driven and as it was shifted to "addition" during the carriage step, now the divisor will be added.

It may be assumed, that a tens transfer on the numeral wheel of the highest place of the result register R takes place after this addition. As a result the tens slide 344 represented in Figure 15, is swung out to the left, and as it, is in this position, is pressed up by the co-operating eccentric 131, Figure 3, its nose 343 acts on the edge 341g of the capacity shift flap 341 and swings the same in the anticlockwise direction, whereby the clutch 52 for the value entering mechanism is opened and the carriage shift clutch 25 is closed through the parts 347, Fig. 16, 499, Figure 15, 490a, 499d, 287 and 43. Owing to this, a carriage shift step is brought about during which, the clutch 52 for the value entering mechanism is prepared for closing, and is closed at the end of the carriage shift step.

Likewise, naturally, during the carriage step, by means of the eccentric 231, which turns downwards out of the position represented in Figure 7, the value entering mechanism is shifted again to subtraction and the revolution counter to addition, and the capacity shift flap 341 is again displaced so far in the opposite direction to that of the arrow "a" that the nose 341a of the same lies against the nose 343 of the tens shift slide 344, which now remains inoperative on the capacity flap as long as tens shifts take place. As soon as no tens shift takes place it is again raised without laterally swinging to the left and swings then the capacity shift flap 341 which introduces the change operations of the clutches. This change play continues until the carriage B has arrived in its extreme left position. In this position the capacity shift flap 341, Fig. 15, is again swung in the anticlockwise direction. As, however, in this position of the carriage, the slide 347 disposed in the carriage, B, is not situated over the flap 499, actuating the carriage shift clutch, but over the part 500, the latter is now rocked against the action of the spring 364d connected to the limb 364c of the locking bail 364b in the clockwise direction around the shaft 490. Hereby the bail 364b, is swung through the rod 504, likewise around the point 364g, in the clockwise direction. In this manner the locking bail 364b is disengaged from the slot 384a, Figure 10, of the division key lever 383, and releases this, whereby the division key 12 springs up into its normal position and accordingly all the mechanisms take up again their rest position and consequently the division operation is finished.

As may be seen from this description, in the usual operation of the machine in division, the value entering mechanism operates in each decimal place, until the carriage assumes its extreme left position regardless of whether the divisor has gone into the dividend without any remainder or not, before the carriage reached its extreme left position. Such operation, however, is very time consuming, especially if, for instance, the capacity of the register extends to sixteen decimal places and the divisor for instance has gone into a dividend of four digits without any remainder. In such cases with the above described usual mechanism, which does not form a part of the invention, the divisor had to be alternatively added or subtracted in the remaining twelve decimal places, in order to return the carriage to its extreme left position.

The present invention, which will now be described, does away with this drawback by means of a device, which as soon as all numeral wheels of the register have assumed their zero position (which is always the case, when the divisor goes into the dividend without any remainder) keeps the carriage shifting clutch automatically closed over all subsequent decimal places. Consequently, as soon as the divisor has gone into the dividend without any remainder, the carriage returns immediately to its extreme left position without stopping in each decimal place and operating the value entering mechanism.

This device is arranged as follows:

Behind the rear wall Br of the totalizer carriage B, (Figs. 1 and 17) discs $a$ (Fig. 21) are fixed on the numeral wheel shafts 556 of the result register, which discs, as shown in Fig. 21 are flattened on the right hand side and are capable of acting on the fingers $b$ of the rail $c$ in a manner to be later described. Let it be assumed that the totalizer carriage B, as well as a bar $c$ in the position as represented in Fig. 21, are in their rest positions, i. e. the totalizer carriage B thus occupies its extreme left-hand position. By means of the screws $d$ which project through the elongated holes $e$ of the bar $c$, the bar $c$ is displaceably mounted on the outer side of the totalizer carriage back wall Br, and is always acted on in the direction of the arrow C by a spring $f$, which is attached to the arm $g$ of the bar $c$ and to a pin $h$ inserted in the rear wall Br. Both the two right-hand fingers $b$ of the bar $c$ are interconnected with the arm $g$ by means of a bridge $c'$, in order to give it a greater capacity for resistance.

The fingers $b$ of the rail $c$, as shown in Fig. 21, extend downwards into the spaces between the discs $a$, that and in such a manner that the discs $a$ on rotation can slide directly past the outer edges of the fingers $b$ without acting upon the bar $c$ in any way. The arm $g$ of the bar $c$ coacts with a projection $i$ fixed on the carriage slide rod, which projection serves for the return of the bar $c$ into the position indicated in Fig. 21 on the movement of the totalizer carriage B into its rest position. The carriage slide rod is fixed in a known manner in the side walls of the machine so as to be non-rotatable and non-displaceable.

The rail $c$ at its left-hand end according to Fig. 21, is provided with a short finger $b'$, which rests normally on the edge $j'$ of the lug $j$ provided on the slide 347, above referred to. The lug $j$ of the slide 347 projects through a cut-out portion $m$ of the totalizer rear wall Br.

The method of operation of the improvement will now be explained by the aid of the following example in division:—

$$1125 \div 25 = 45$$

The dividend 1125 is set wholly at the left in the result totalizer R (Fig. 1) and the divisor 25 in the key board T and obviously in such a manner that the highest place of the divisor stands opposite to the highest place of the dividend in the carriage which is now drawn fully out to the right by depressing the carriage right hand shift key 11.

The movements brought about by the depression of this key are briefly as follows:

On depression of the carriage right shift key 11, (Fig. 10) the key lever 412 is rocked in the clockwise direction, according to which the bar 424 is drawn in the opposite direction of the arrow a. As a result, the angle lever 425 (Figures 15 and 13) is also rocked in the clockwise direction, whereby its arm 425a contacts with the lever 434 which in the extreme left position of the carriage is already held rocked in the clockwise direction by means of the parts 443, 442, 434. Since the purpose of the make up of the body 434, 433, 432 of three parts is without any importance for the present invention, the three parts 434, 433, 432 may be considered as moving together as a unit. Consequently, according to the position of this unit as represented in Figure 13, the rod 439 is displaced in the opposite direction of the arrow d, according to which the bail 230 is rocked in the direction of the arrow p (Figures 13 and 7) whereby the key 217, 216 is displaced in the opposite direction of the arrow "a", coupling thereby the carriage right shift wheel 211 with the bushing 210 of the carriage shifting disc 219 to 221, which with its pins 220, 221 is in engagement with the slots 222 (Fig. 13) of the carriage shift rail 223. From the foregoing it results that as soon as the carriage moves to the right (whereby the abutment 443, Fig. 13 removes from the arm 442a of the lever 442) the parts 442, 434, 433, 432, 439, 230 will nevertheless retain their position, illustrated in Figure 13 on account of the fact that the arm 425a of the angle lever 425, owing to the depressed key 11, keeps the lever 434 rocked in the clockwise direction.

As the angle lever 425 (Fig. 15) has been rocked in the clockwise direction, its finger 425b acted upon the part 426, fixed to the shaft 287, swinging the same thereby in the opposite direction of the arrow e1. Accordingly the lever 43 (Fig. 12) which is fast on shaft 287 is also rocked in the opposite direction of the arrow e1, releasing thereby the nose 41 (Fig. 2) of the pawl 37 (Fig. 6) of the carriage shift clutch 25, so that the pawl 37 by its spring 40 is coupled with the cam 26, fixed on the main drive shaft 3.

In the swinging movement of the lever 43 (Fig. 12) its lug 304 acts on the lever 291, 294, 295, and rocks the same in the anticlockwise direction whereby the lever 22, pivoted at 22x slips off from the disc 20. As a result, the spring 295b rocks the lever 22 in the anticlockwise direction, the lower end of which releases the contact spring 299 whereby the motor contact 300, 302 is closed. Consequently, the motor D through the intermediary of the worm gear 1, 2 drives the main drive shaft 3 in the direction of the arrow e. As the carriage shift clutch 25 has been closed, the gear 24 (Figures 6 and 2) fixed to it, is also rotated in the direction of the arrow e. Since the gear 24 meshes directly with the carriage right shift gear 211, the latter is rotated in the direction of the arrow r. Hence, the carriage shifting disc 219 to 220 rotates in the same direction on account of the fact that its bushing 210 is coupled by means of the key 216, 217 with the carriage right shift gear 211. Since the pins 220 and 221 of the disc 219 are in engagement with the slots 222 (Fig. 13) of the carriage shift rail 223, the carriage B is shifted to the right.

In its extreme right hand position its abutment 444 (Fig. 13) acts on the arm 442a of the lever 442 and rocks the same in the clockwise direction. Thereby, through the intermediary of the parts 434, 425a, 425, 424 the carriage right shift key lever 412 is rocked in the anticlockwise direction against the pressure of the operator's finger on the key 11.

Furthermore through the parts 434, (Fig. 13), 433, 432, 439 and 230 the key 216, 217 (Fig. 7) is shifted in the direction of the arrow "a" (Fig. 7) is coupling the carriage left shift gear 212 with the bushing 210 as is necesary for the division process. This position of the parts is retained even if the carriage abutment 444 (Fig. 13) removes from the arm 442a of the lever 442, on account of the fact, that in any intermediate positions of the carriage, the spring 442c keeps the lever 442 rocked in the clockwise direction. Since in the rocking movement of the lever 425 (Fig. 15) in the anti-clockwise direction, the finger 425b releases the part 426, the shaft 287 and together with it the lever 43 return to their normal position through the agency of the spring 306. As the lug 304 of the lever 43 releases the lever 291, 294, 295, the latter is also returned to its normal position by its spring 297 as soon as the lever 21 was permitted to slide from the surface 20g on to the cut off portion 20h of the cam 20. As the cam 20 rotates, the lever 21 is rocked in the clockwise direction sliding thereby on to the full cylindrical part 23. Accordingly the motor contact 300, 302 is opened and the machine comes to a standstill.

In the extreme right hand position of the carriage, the eccentric 231 (Fig. 6) of the carriage right shift wheel 211 is displaced through 180° from the position shown in Figure 6, so that through the parts 232, 234, 233 and 235, the bar 236 is displaced in the direction of the arrow "a" which is, as may be seen later, of importance for beginning the division process.

The discs a, fixed to the four numeral wheel shafts 556 on the left, thus occupy in consequence of the setting of the dividend 1125, the position shown in Fig. 21, i. e. the discs a of the two left hand numeral wheel shafts 556 are shown rotated through one unit, the disc a of the 3rd numeral wheel shaft 556 through two units, and the disc a of the fourth numeral wheel shaft 556 from the left through five units. Each of these four discs a has thus been rotated to such an extent that now their circular surfaces lie without any lost motion between the fingers b, of the bar c, whereby the bar c cannot thus be drawn in any case to the left by the spring f attached to its arm g until the discs a of the four set left-hand numeral wheel shafts 556 or number rollers 554 have again taken up their zero position.

It may be here recalled that the carriage B is in its right hand position, owing to which the arm g of the bar c is naturally now separated from the projection i, so that this does not prevent the bar c travelling to the left under the action of the spring f.

It will be clear from this explanation that the bar c during the movement to the right of the carriage B could be displaced to the left in the event that the dividend is set only after the displacement of the carriage to the right.

In this case, however, the displacement of the bar c to the left is prevented by the short finger b', lying against the edge j' of the lug j of the slide 347, so that an unrestricted setting of the numeral wheel shafts 556 is always possible no matter in what position the carriage may be.

After the dividend and the divisor have thus been set and after the carriage assumes its extreme right hand position the division key 12 (Fig. 10) is depressed, and is locked in the depressed position by means of the locking yoke 364b whereby, as explained above, the division process automatically proceeds by subtraction in the following manner.

As has been explained above, in the extreme right hand position of the carriage B, the bar 236 (Figures 7 and 10) is displaced in the direction of the arrow a. Owing to the depression of the division key 12, through the intermediary of the parts 383, 395, 396, 396a, 397, 398, 408, the bar 236 is depressed, whereby its edge 236a (Fig. 12) acts on the pin 332 of the lever 325 and rocks the same in the anticlockwise direction whereby the pin 332 engages the slot 236b whereas the shaft 326, as has been explained releases the rack 330 and locks the rack 331 of the value entering mechanism, according to which the value entering mechanism is set for subtraction. As the slot 334 of the bar 333 engages always the pin 332, the bar 333 is displaced in the direction of the arrow a, rocking thereby the lever 333a in the anticlockwise direction and the rail 336 in the clockwise direction. Consequently, the lever 340 (Fig. 15) which embraces the rail 336 is rocked in the anticlockwise direction, shifting thereby the capacity shift flap into the position, illustrated in Fig. 15, in which as has been explained, the nose 341a of the flap lies just above the nose 343 of the tens carrying slide 344.

As a result of the rocking movement of the lever 325 (Fig. 12) in the anticlockwise direction, the shaft 251 and the lever 252 have also been rocked in the same direction, according to which the lever 252 is moved from the position shown in Figure 18 into the position shown in Figure 20.

On depression of the division key 12, its key lever 383 acted at the same time on the lug 387, whereby through the intermediary of the parts 388, 389, 390, 393 (Fig. 14), 394, 261, 259, 260 and 258, the rod 255 has also been shifted from the position shown in Figure 18 to the position shown in Figure 20, according to which the rod 255 has been displaced in the direction of the arrow a (Figure 5). Consequently, by means of the angle lever 167, 169, the key 130, 163 couples the gear 157 with the bushing 156 on which the gear 171 is fixed, which in its turn, meshes with the gear 173, fixed on the driving shaft 172 of the revolution counter, which is thus set for addition.

Since now all adjustments have been made, namely the value entering mechanism has been set to subtraction and the revolution counter to addition, it is only necessary to close the clutch for the value entering mechanism and to close the motor contact. This is brought about in the following manner.

On depression of the division key 12, its lever 383 acted upon the lug 395 of lever 396. Through the intermediary of the parts 397, 398, 399, 400, 401, 401a, 401b, 272, 271, (Fig. 12), 283, 284, 285, 286, 288, 289c, 306, the coupling lever 43 together with the shaft 287 are rotated in the direction of the arrow e1, releasing thereby the nose 70 (Figures 2 and 6) of the pawl 65 of the clutch 52 of the value entering mechanism. Accordingly the nose 71 of the pawl 65 under the action of its spring 69 engages the cam 26 fixed on the main drive shaft 3.

The rotation of the latter is now performed as follows:

In the swinging movement of the lever 289a in the direction of the arrow e1, the edge 290 of the lever 289a acts on the roller 292 of the levers 291, 294, 295, 22 whereby the motor contact 300, 302 is closed. As a consequence the motor shaft rotates and through the gearing 1, 2 the main drive shaft 3 is rotated in the direction of the arrow e, whereby also the clutch 52 is rotated in the same direction. As the gear 56 is fixed on the clutch 52, the value entering mechanism E (Fig. 14) is actuated through the parts 78 (Fig. 2), 116 (Fig. 14), 117, 124 and the proportional lever (not shown). Accordingly the complement of the divisor 25 is entered additively through the parts 154, 153, 155 into the result register R, whereas the revolution counter receives its drive through the parts 79 (Figures 2 and 3), 127, 128 (Figure 5), 181, 183, 157, 156, 171 (Fig. 8) and 173, thus counting the revolutions of the main drive shaft 3 additively.

The calculating process which takes place in the result register during the first main shaft revolution is as follows:

$$1\times(-25) = \begin{cases} 112500000 \\ +749999999 \\ +1 \\ \hline 862500000 \end{cases}$$

The numeral wheel of the highest place has thus rotated through 7 units, that of the second place from the left through 5 units and all the remaining numeral wheels through ten units. Whilst in this calculating process all the numeral wheels to the right of the four highest place numeral wheels thus move to zero and the numeral wheels of the third and fourth places from the left overstep the zero, the numeral wheels of the two highest places are rotated to "8" and "6". From this it is evident that a springing movement to the left of the bar C is avoided principally by the discs a of the numeral wheels of the two highest places.

As in each rotation of the main shaft all the tens slides 344 are raised, so in the first revolution of the main shaft, the capacity shift flap 341 is swung in the anti-clockwise direction by the nose 343 (Fig. 15) of the tens slide 344 of the highest place, whereby the shift flap with its lug 345 (Fig. 16) presses on the lug 346 of the slide 347 and displaces the same downwards against the action of its spring 351. The slide 347 then acts with its lower end on the flap 499, and swings this in the clockwise direction, whereby through the intermediary of the parts 490a, 499d, the shaft 287 and the coupling lever 43 (Fig. 12) are rocked in the opposite direction of the arrow e1 (Fig. 2). Thereby the spring 306, arranged between the lug 304 of the coupling lever 43 and the arm 289c of the lever 289 is tensioned because the latter is held stationary through the intermediary of the parts 285, 284, 283, 271, 272 (Fig. 10), 401b, 401a, 400, 399, 398, 397, 396, 395 and 383 by the division key 12, which as has been mentioned is locked in its depressed position. As the coupling lever 43 is rocked in the opposite direction of the arrow e1 (Figures 2 and 6) the coupling lever 43 comes into the path of the pawl 70, 65 of the clutch 52 for the value entering mechanism, opening thereby this clutch. On the other hand the pawl 41, 37 of the carriage shift clutch 25 is released, whereby this clutch is closed. Consequently the carriage B is shifted to the left through the intermediary of the parts 24 (Fig. 6), 218, 212, 217, 216, 210, 220, 221, 222 (Fig. 13) 223 one step. Since the clutch 52 for the value entering mechanism has made only one revolution, the revolution counter shows a "1" in its highest place.

In the displacement of the slide 347 downwards, its lug j with its edge j' has released the finger b' of the bar c, so that this bar can spring to the left, which, however, as already mentioned above, is prevented by the discs a which are not at zero. A springing of the bar c to the left at the moment at which the slide 347 is displaced downwards can only take place if all of the discs a or their numeral wheels 554 are in their zero positions simultaneously, which is only the case when division proceeds without a remainder.

As therefore the bar c cannot travel to the left, the slide 347 can, as soon as the tens transfer slide 344 descends into its rest position, under the action of its spring 351, move freely upwards and release the flap 499 whereby this flap as mentioned above swings in the anti-clockwise direction and through the parts 490a, 499d, 287 and 43 under the action of the tensioned spring 306, opens the carriage shift clutch and closes the clutch for the value entering mechanism.

Figure 9:
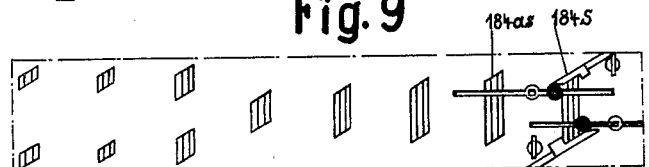
Fig. 9 shows the development of the periphery of the tens carrying shaft according to Figure 8.

During the carriage step the eccentric 231 (Fig. 7) has been rotated through 180° and assumes now the position according to Fig. 7. As a consequence, through the intermediary of the parts 232, 234, 233, 235 the bar 236 (Fig. 12) is shifted in the opposite direction of the arrow a, whereby the lever 325 is rocked to the position shown in Fig. 12, in which the shaft 326 blocks the rack 330 and releases the rack 331, according to which the value entering mechanism is set for addition. As, therefore, the lever 325 has been rocked clockwise, the shaft 251 and the lever 252 have also been rocked clockwise, viz. from the position shown in Fig. 20 into the position shown in Fig. 9. Accordingly, the bar 255 has been displaced in the opposite direction of the arrow "a", whereby the angle lever 167, 169 has been brought in the position, shown in Fig. 5 according to which the key 130, 163 couples the wheel 129 with the bushing 156 so that now motion may be transmitted from the gear 79 (Fig. 3) through the gears 127, 128, 129 (Fig. 5), 171 to the gear 173 (Fig. 8) according to which the revolution counter is now set for subtraction.

In the rocking movement of the lever 325 (Fig. 12) in clockwise direction the pin 332 took the bar 333 along with it, whereby through the intermediary of the parts 333a, 336 and 340, the capacity shift flap 341 has been displaced in the direction of the arrow "a" (Fig. 15) whereby its nose 341a is disengaged from the nose 343 of the tens slide 344 while the edge 341g of the capacity shift flap 341 is positioned in a preparatory working position in relation to the nose 343 of the tens slide 344. The working position is for this reason a preparatory one, since as is represented in Fig. 15, the edge 341g of the capacity shift flap 341 is set back to the left, by a determined amount, in relation to the nose 341a of the same. The edge 341g can therefore only be engaged by the nose 343 of the tens transfer slide 344 if this is swung by a tens transfer process to the left.

After all these adjustments have taken place and after the clutch 52 for the value entering mechanism has again been closed the following calculation process takes place:

$$6 \times (+25) = \begin{cases} 862500000 \\ +25 \\ +25 \\ +25 \\ +25 \\ +25 \\ +25 \\ 012500000 \end{cases}$$

In the sixth revolution as is evident from the just mentioned calculating process, a tens transfer in the highest place takes place. The tens slide 344 is thus during its ascending movement swung to the left and thereby again swings the capacity shift flap 341 in the anti-clockwise direction, whereby as before mentioned a carriage step again results, and during the carriage step the capacity shift flap 341 is displaced into the position according to Fig. 15 whilst the value entering mechanism is shifted for subtraction and the revolution totalizer U for addition. In this operation in consequence of the tens transfer the "1" in the highest place of the revolution counter has disappeared and in the second place from the left a "4" appears.

As the discs a again could not come simultaneously to zero, the bar c could not spring to the left; the slide 347 can thus move upwards again and after the resulting carriage step, the value entering mechanism operates again and now the machine calculates:—

$$6 \times (-25) = \begin{cases} 01250000000 \\ +99749999999 \\ +1 \\ +99749999999 \\ +1 \\ +99749999999 \\ +1 \\ +99749999999 \\ +1 \\ +99749999999 \\ +1 \\ +99749999999 \\ +1 \\ 99750000000 \end{cases}$$

As in this calculating process during 5 revolutions, tens transfers now result in the highest place, so the tens slide 344 each time in its upward movement is swung to the left and is so not capable of acting either on the nose 341a, or in consequence of its recess 344a, on the edge 341g of the capacity shift flap 341. As will be seen from the following example, the result register R shows already zeros in the fifth revolution, viz:

```
   01250000000
  +99749999999
           +1
  +99749999999
           +1
  +99749999999
           +1
  +99749999999
           +1
  +99749999999
           +1
   00000000000
```

Accordingly also all the discs a assume at this stage of the calculation their zero position. As, however, up to that time the capacity shift flap 341 has not been rocked, the slide 347 has not been depressed and accordingly the lug $j$ of the slide 347 locks the bar $c$ in its right hand position through the intermediary of the lug $b'$ on the bar $c$. In the 6th revolution, for the first time tens transfer in the highest place does not take place. The consequence is that the tens slide 344 then swings the capacity shift flap 341 and releases a carriage step, in the course of which the capacity shift flap is again displaced in the direction of the arrow $a$ whilst the value entering mechanism is shifted for addition and the revolution counter is shifted for subtraction.

As the revolution counter U added this now shows in the second and third places from the left, the value "46".

After the resulting carriage step, the machine calculates:—

$$10\times(+25)=\begin{cases}99750000000\\+25\\+25\\+25\\+25\\+25\\+25\\+25\\+25\\+25\\+25\\\hline 00000000000\end{cases}$$

In the tenth rotation of the main shaft a tens transfer thus again results in the highest place, in consequence of which the tens slide 344 is again swung towards the left. In this operation while moving upwards, the nose 343 of the tens slide 344 acts on the edge 341g of the capacity shift flap 341, and swings the same in the anti-clockwise direction, whereby through the parts 347 (Fig. 16), 499 (Fig. 15) 490a, 499d, and 287, the clutch for the value entering mechanism 52 (Figs. 2 and 6), is opened, and the carriage shift clutch is closed, so that the totalizer carriage B moves to the left.

As is obvious from the calculating process just described, on the tenth revolution of the main shaft, all the discs $a$ or their numeral wheels 554, simultaneously stand at zero, and in the revolution counter U, in consequence of the tens transfer the "6" in the third place from the left has been changed into a "5", so that now the correct quotient 45 may be read in the second and third places from the left in the revolution totalizer U.

In the swinging movement of the capacity flap 341, arising from the tenth revolution of the main shaft, the bent-in end 345 of the flap acts on the lug 346 of the slide 347, whereby the latter is pressed downwards against the action of its spring 351. With the slide 347, the lug $j$ of the slide 347 which projects through the slot $m$ of the rear wall of the totalizer carriage Br, likewise moves downwards. Thereby the edge $j'$ of the lug $j$ comes out of engagement with the finger $b'$ of the bar $c$. The bar $c$ can now, as all the discs $a$ are at zero, follow the pull of its spring $f$ and moves in the direction of the arrow C (Fig. 21), so that the lower edge of the finger $b'$ comes to rest on the upper edge of the lug $j$ and thus holds the slide 347 in its depressed position.

A movement of the bar $c$ in the direction of the arrow C is possible, since as previously described, the numeral wheels of the shafts 556 are all at zero, and the discs $a$ thus have their flattened portions on the right hand side, so that the edges of the fingers $b$ of the bar $c$ rest on the opposite flattened edges of the discs $a$. Through the retention of the slide 347 in its depressed position, the flap 499 is held in its swung position and the carriage shift clutch remains closed until the totalizer carriage B enters its extreme left position.

If the totalizer carriage B has now attained its rest position, the slide 347 is no longer over the flap 499 which operates the carriage shift clutch, but over the flap 500. The slide 347 which is still in its depressed position slides, by means of the bevel 347x (Fig. 16) at its lower end, on to the top of the flap 500 and depresses the flap 500 against the action of the spring 364d attached to the limb 364c of the locking yoke 364b, in the clockwise direction around the shaft 490. The yoke 364b is thus swung round its axis 364g, likewise in the clockwise direction by the rod 504. In this way the locking yoke 364b releases the division key whereby the latter under the action of its spring 386 (Fig. 10) springs back into its normal position. Consequently, all the mechanisms assume their rest position again, and the division process is thus completed.

If the totalizer carriage B has now arrived in its extreme left position, the arm $g$ of the bar $c$ impinges against the fixed projection $i$, so that the bar $c$ is returned against the action of its spring $f$ and it takes up again the normal position represented in Fig. 21. In this movement of the bar $c$, the short finger $b'$ of the bar $c$ moves out of action in relation to the lug $j$ of the slide 347, so that the latter under the action of its spring 351 moves upwards, and likewise takes up its rest position represented in Fig. 21. By the upward movement of the slide 347, the capacity shift flap 341, is positively swung round its shaft 342 in the clockwise direction, and likewise returned into its position of rest by the contact of the downwardly bent end 345 of the capacity shift flap 341 against the lug 346 of the slide 347.

On the performance of a new calculation for division the above described process is repeated.

In Figs. 16 and 22, a second slightly modified form of the first form of the invention is represented, which operates in substantially the same manner as in the principal form.

The bar $c$ in this form of the invention is, in contradistinction to the principal form, displaceably arranged underneath the discs $a$ in the hereinbefore described manner, so that the fingers $b$ extend upwards into the clearance space of the discs $a$. At the left-hand end, the bar $c$ is provided with a nose $o$, according to Fig. 22, which, if the totalizer carriage B is in its extreme left position, contacts with the edge of the slide 347. In this construction, the slide 347 is provided with a lug $p$, which projects through a cut-out portion $q$ of the totalizer carriage rear wall Br, and is provided with a recess $r$ formed according to Fig. 22. With this recess, the nose $o$ of the bar $c$ is capable of engagement as soon as all the discs $a$ simultaneously take up their zero position and the capacity is overreached. The operation is shortly as follows:—

As soon as the numeral wheels 554 of the shafts 556 arrive simultaneously at zero for the first time, as follows from hereinbefore described operation, the slide 347 is pressed downwards. The recess $r$ of the slide 347 thereby enters into the path of the nose $o$ of the bar $c$, whereby the nose $o$ enters into the recess $r$ and thus holds the slide 347 in its depressed position. The bar $c$ can, on the above mentioned grounds, slide in the direction of the arrow C under the action of its spring *f*, so that the edges of the fingers *b'* rest on the flattened edges of the discs *a*.

If the totalizer carriage B has arrived at its rest position, the arm *g* impinges against the projection *i* fixed on the carriage slide rod and the bar *c* is moved against the action of its spring *f*, so that the nose *o* comes out of engagement with the recess *r* of the lug *p* of the slide 347 and the modified mechanism takes up its rest position represented in Fig. 22. The other mechanisms act in a similar manner to that above described.

As is evident from Figs. 21 and 22, the bar *c* stretches only over a part of the numeral wheels shafts 556 i. e. the six lowest numeral wheels shafts are not provided with the discs *a*. This is not necessary for the reason that so far as concerns the dividend in the 6th place from the right it is not worth while to allow the arrangement according to the invention to come into operation, as these few places are quickly evaluated.

There is, nevertheless, no reason against associating the arrangement according to the invention with all the numeral wheel shafts without departing from the essence of the invention.

Further, it may be mentioned that the arrangement according to the invention, although it is shown here in combination with a power-driven machine, is likewise equally applicable to a hand operated machine.

I claim:—

1. In a calculating machine, a totalizer including tens transfer mechanism for each order, a plurality of shafts and numeral wheels on said shafts, cam-like members on said shafts disposed in corresponding position when the numeral wheels are brought to zero position, a displaceable member coacting with said cam-like members displaceable when the numeral wheels are brought to zero position, a value entering mechanism, means for operating said value entering mechanism, means for rendering the first mentioned means inoperative, a member operative to control the second means to render said value entering mechanism inoperative, means operable by the tens transfer mechanism of the highest order to operate said control member, and means for displacing said displaceable member to hold said control member in operative position when said numeral wheels are brought to zero position.

2. In a computing machine, the combination with a carriage returnable step by step to starting position, carriage shift mechanism for effecting the carriage return, a totalizer on said carriage including denominational value wheels, transfer devices for said wheels, respectively, and value entering mechanism for rotating a plurality of said wheels into and from zero registering position, of a motor drive for said carriage shift and value entering mechanisms, drive conditioning means operative under control of the transfer device of highest denomination to cause said drive to alternately operate said entering mechanism and said carriage shift mechanism to effect a step of movement of said carriage, and mechanism to retain said conditioning means operative to return the carriage to starting position said last named mechanism rendered effective upon restoration of all of said value wheels to zero position.

3. In a calculating machine, the combination with a carriage returnable step by step to starting position, carriage shift mechanism for effecting the carriage return, a totalizer on said carriage including denominational value wheels, transfer devices for said wheels, respectively, and value entering mechanism for rotating a plurality of said wheels into and from zero registering position, of a motor drive for said carriage shift and value entering mechanisms, drive conditioning means operative under control of the transfer device of highest denomination to cause said drive to alternately operate said entering mechanism and said carriage shift mechanism to effect a step of movement of said carriage, and mechanism to retain said conditioning means operative to return the carriage to starting position, said last named mechanism rendered effective upon restoration of all said value wheels to zero position and temporarily disabling said conditioning means against conditioning of said drive for operation of said entering mechanism.

4. In a calculating machine, the combination with a carriage returnable step by step to starting position, carriage shift mechanism for effecting the carriage return, a totalizer on said carriage including denominational value wheels, transfer devices for said wheels, respectively, and value entering mechanism for rotating a plurality of said wheels into and from zero registering position, of a motor drive for said carriage shift and value entering mechanisms, drive conditioning means operative under control of the transfer device of highest denomination to cause said drive to alternately operate said entering mechanism and said carriage shift mechanism to effect a step of movement of said carriage and comprising a flap along which said carriage travels vertically swingable into carriage shift mechanism and entering mechanism driving positions respectively, and mechanism to retain said conditioning means operative to return the carriage to starting position, said last named mechanism rendered effective upon restoration of all said value wheels to zero position and temporarily locking said flap in carriage driving position.

5. In a calculating machine, the combination with a carriage returnable step by step to starting position, carriage shift mechanism for effecting the carriage return, a totalizer on said carriage including denominational value wheels, transfer devices for said wheels, respectively, and value entering mechanism for rotating a plurality of said wheels into and from zero registering position, of a motor drive for said carriage shift and value entering mechanisms including a pair of carriage shift mechanism and entering mechanism driving clutches, respectively, drive conditioning means operative under control of the transfer device of highest denomination to alternately engage said clutches, and mechanism to retain said conditioning means operative to maintain the carriage shift clutch engaged and thereby return said carriage to starting position, said last named mechanism rendered effective upon restoration of all said value wheels to zero position.

6. In a calculating machine, the combination with a carriage returnable step by step to starting position, carriage shift mechanism for effecting the carriage return, a totalizer on said carriage including denominational value wheels, transfer devices for said wheels, respectively, and value entering mechanism for rotating a plurality of said wheels into and from zero registering position, of a motor-drive for said carriage shift and value entering mechanisms including a pair of carriage shift mechanism and entering mechanism driving clutches, respectively, drive conditioning means operative under control of the transfer device of highest denomination to alternately engage said clutches and comprising a flap along which the carriage travels vertically swingable into carriage shift mechanism and entering mechanism driving positions, respectively, and means to retain said flap in carriage shift mechanism driving position to thereby effect return of said carriage to starting position said last named means rendered effective upon restoration of all said value wheels to zero position.

7. In a calculating machine, the combination with a carriage returnable step by step to starting position, carriage shift mechanism for effecting the carriage return, a totalizer on said carriage including denominational value wheels, transfer devices for said wheels, respectively, and value entering mechanism for rotating a plurality of said wheels into and from zero registering position, of a motor drive for said carriage shift and entering mechanisms, drive conditioning means operative to condition said drive for alternate driving of said carriage shift mechanism and entering mechanism and comprising a slide on said carriage operative by the transfer device of highest denomination, a flap traversed by said slide during movement of the carriage and operative under control of said slide into carriage shift mechanism and entering mechanism driving positions, respectively, and mechanism to retain said conditioning means operative to return said carriage to starting position, said last named mechanism rendered effective upon restoration of all said value wheels to zero position and temporarily retaining said flap in carriage driving position.

8. In a computing machine the combination with a carriage returnable step by step to starting position, carriage shift mechanism for effecting the carriage return, a totalizer on said carriage including denominational value wheels, transfer devices for said wheels, respectively, and value entering mechanism for operating a plurality of said wheels into and from zero registering position, of a motor drive for said carriage shift and value entering mechanisms, drive conditioning means operative to cause said drive to alternately operate said entering mechanism and said carriage shift mechanism to effect a step of movement of said carriage and comprising a slide on said carriage operative under control of the transfer device of highest denomination, a flap traversed by said slide during movement of the carriage and operative under control of said slide into carriage shift mechanism and entering mechanism driving positions, respectively, mechanism to retain said conditioning means operative to return said carriage to starting position, said last mentioned mechanism comprising a locking bar coacting with said slide to retain said flap in carriage shift mechanism driving position, and means to operate said bar rendered effective upon restoration of all value wheels to zero position.

9. In a computing machine, the combination with a carriage returnable step by step to starting position, carriage shift mechanism for effecting the carriage return, a totalizer on said carriage including denominational value wheels, transfer devices for said wheels, respectively, and value entering mechanism for rotating a plurality of said wheels into and from zero registering position, of a motor drive for said carriage shift and value entering mechanisms, drive conditioning means operative to cause said drive to alternately operate said entering mechanism and said carriage shift mechanism to effect a step of movement of said carriage and comprising a slide on said carriage operative under control of the transfer device of highest denomination, a flap traversed by said slide during movement of said carriage and operative under control of said slide into carriage shift mechanism driving and entering mechanism operating positions, respectively, mechanism to retain said conditioning means operative to return said carriage to starting position, said last mentioned mechanism comprising a locking bar operative into locking relation to said slide to retain said flap in carriage shift mechanism driving position, and means to operate said bar rendered effective upon restoration of all value wheels to zero position.

10. In a computing machine the combination with a carriage returnable step by step to starting position, carriage shift mechanism for effecting the carriage return, a totalizer on said carriage including denominational value wheels, transfer devices for said wheels, respectively, and value entering mechanism for rotating a plurality of said wheels into and from zero registering position, of a motor drive for said carriage shift and value entering mechanisms, drive conditioning means operative to cause said drive to alternately operate said entering mechanism and said carriage shift mechanism to effect a step of movement of said carriage and comprising a flap along which said carriage moves vertically swingable under control of the transfer device of highest denomination into carriage shift mechanism and entering mechanism operating positions, respectively, and mechanism to retain said flap in carriage shift mechanism driving position said last mentioned mechanism comprising a locking bar movable into and from locking position, and means for moving said bar into locking position rendered operative upon restoration of all value wheels to zero position.

11. In a calculating machine, the combination with a carriage returnable step by step to starting position, carriage shift mechanism for effecting the carriage return, a totalizer on said carriage including denominational value wheels, transfer devices for said wheels, respectively, and value entering mechanism for rotating a plurality of said wheels into and from zero registering position, of a drive for said carriage shift and value entering mechanisms, drive conditioning means operative under control of the transfer device of highest denomination to cause said drive to alternately operate said entering mechanism and said carriage shift mechanism to effect a step of movement of the carriage, and mechanism to retain said conditioning means operative to return said carriage to starting position said last mentioned mechanism rendered effective upon restoration of all value wheels to zero position and comprising a tensioned bar operative under the tension exerted thereagainst to lock said conditioning means, and means for controlling such operation of said bar comprising cams related to said value wheels, respectively, and rotated thereby.

AUGUST FRIEDRICH POTT.